Aug. 24, 1948.  W. R. HARRIS  2,447,648
CURRENT REGULATING GENERATOR AND CONTROL
Filed July 5, 1947
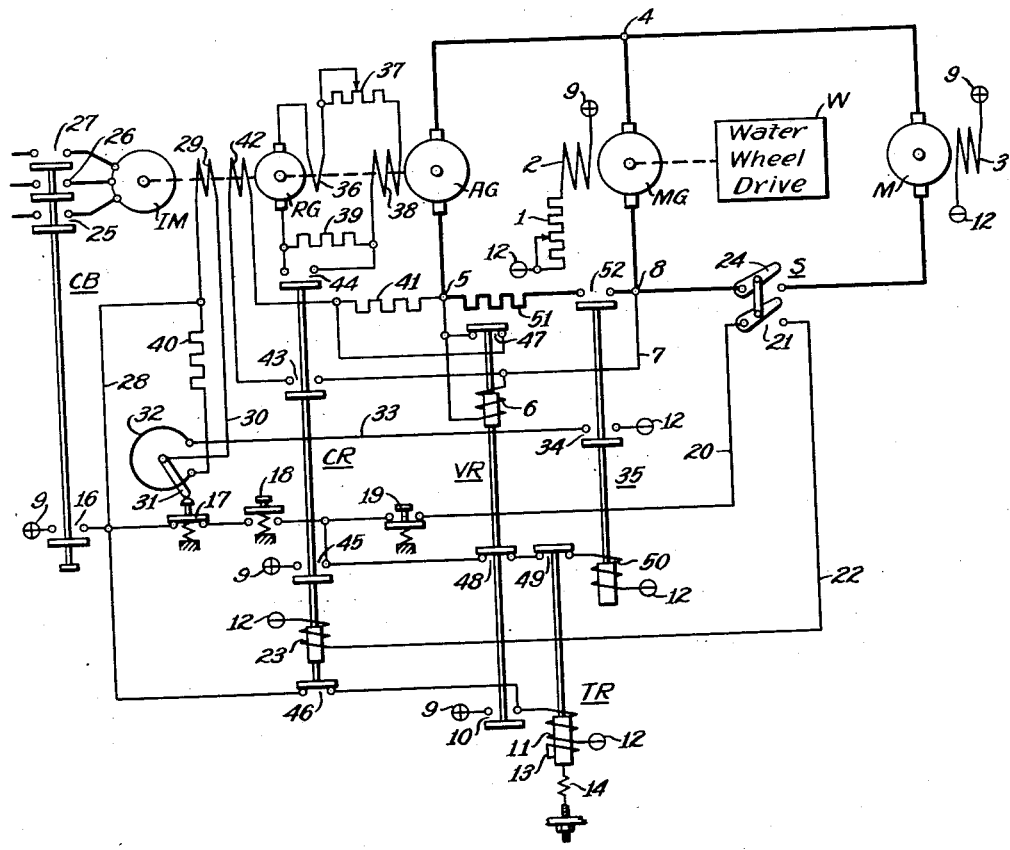
WITNESSES:
Robert C. Baird
Dw. C. Groome
INVENTOR
Walter R. Harris.
BY
Paul E. Friedemann
ATTORNEY Patented Aug. 24, 1948

2,447,648

UNITED STATES PATENT OFFICE 2,447,648

CURRENT REGULATING GENERATOR AND CONTROL

Walter R. Harris, Pittsburgh, Pa., assignor to Westinghouse Electric Corporation, East Pittsburgh, Pa., a corporation of Pennsylvania Application July 5, 1947, Serial No. 759,273

9 Claims. (Cl. 171—119)

My invention relates to electric systems of control, and, more particularly, to systems of control for the paralleling and continued parallel operation of two direct-current generators.

Controls for the parallel operation of direct-current generators are known, but I am not aware of any efficient and reliable control scheme for paralleling an auxiliary direct-current generator with a main generator that is to supply a constant voltage though driven by a prime mover of variable power output.

One broad object of my invention is to provide for the paralleling of an auxiliary direct-current generator with a main direct-current generator.

Another object of my invention is to automatically match the voltage of an auxiliary direct-current generator with the voltage of a main generator with which the auxiliary generator is connected in parallel.

It is a specific object of my invention to automatically and in response to the voltage difference between an auxiliary generator and a main generator to control the voltage of the auxiliary generator.

Other objects and advantages will become more apparent from a study of the following specification and the accompanying drawing, in which:

The single figure is a diagrammatic showing of my contribution to the art.

In my system of control, the main generator MG is operated at a constant speed from a suitable prime mover as a waterwheel. In case of an overload on the main generator, low water, or loss of efficiency of the waterwheel, it is very desirable to take some of the load off the main generator.

My invention is primarily concerned with the system of control for connecting the auxiliary generator AG in parallel to the main generator MG and to match the voltage of the auxiliary generator to the voltage setting of the main generator and to automatically maintain the proper voltage relation between the generators for any voltage setting of the main generator. For this automatic control, I utilize a regulating generator RG. The control for the main generator MG is not shown because the details of that control form no part of this invention.

In normal use, the main generator MG may be considered as operating at constant speed and the rheostat 1 for the field 2 is adjusted to assure a selected constant value of voltage output from the main generator. Even if the main generator operates at variable speed, the field control is such that the main generator may supply the motor M with a constant voltage selected at any point over a wide range of voltages.

The motor M may be considered as driving any suitable load, and the excitation of the motor field 3 may be selected to be constant or variable depending on the needs of the particular application.

The regulating generator RG supplies the excitation for the auxiliary generator AG. This regulating generator has three field windings, namely, a series field winding 36, which may also be termed a self-energizing field winding, a pilot field winding 42, and a pattern field winding 29. The auxiliary generator AG and the regulating generator RG are both coupled to be driven by the same prime mover, as an internal combustion engine, turbine, or induction motor IM shown.

When the auxiliary generator is to be paralleled to the main generator, it is desirable, on starting, that the pattern field 29 be deenergized. The pilot field 42 under starting conditions is so connected to the two generators that current will flow in this field only when there is a difference of voltage between the two generators AG and MG. Under normal operating conditions, the pilot field 42 measures the drop across the resistor 51 in the armature circuit of the auxiliary generator which serves as an indication of the current output of the auxiliary generator AG.

The control is so arranged that it is not possible to start the operation of paralleling unless the current adjusting rheostat is in the position of low current for field 29, the starting switch CB for the motor IM is closed, and the loop circuit including the main generator MG and motor M is closed by the closed position of switch S.

A better understanding of my invention may very likely be had from a study of a typical operating cycle. If the main generator is driven at the required speed by the waterwheel and switch S is closed, then the motor M operates its load.

The voltage of the generator MG selected is determined by the setting of the rheostat 1 for field 2. The junction 4 will thus have a given positive value. Since the voltage of the auxiliary generator at this stage is zero, it follows that junction 5 will have substantially the same voltage as junction 4. The result is that an energizing circuit is established from junction 5 through coil 6 of the voltage relay VR, the conductor 7, to the negative junction, or terminal 8. Operation of the voltage relay VR causes the opening of contacts 47 and 48, and the closing of contacts 10. The closing of contacts 10 establishes an energizing circuit from positive terminal 9, through contacts 10, coil 11 of the time limit relay TR to the negative terminal 12. This time limit relay has a short-circuited winding 13 and time limit adjusting means 14. The function of this relay is such that upon energization of its coil 11, it operates almost instantly to open contacts 49, but upon deenergization of coil 11, a selected time period elapses before contacts 49 close.

If the motor load is such that the auxiliary generator should be connected in parallel to the main generator, then the attendant operates the circuit breaker CB to close contacts 16, and contacts 25, 26 and 27. The closure of contacts 16 establishes a circuit from the positive terminal 9 through contacts 16 of the circuit breaker CB, contacts 46 of the control relay CR, and coil 11 of the time limit relay TR to the negative terminal 12. From this additional circuit for coil 11, it is apparent that the energization of this coil 11 is independent of the closed condition of contacts 10.

To continue with the paralleling operation, the "on" switch 18 is closed, whereupon a circuit is established from the positive terminal 9 through contacts 16 of the circuit breaker CB, the push-button type switches 17, 18 and 19, conductor 20, contacts 21 of switch S, conductor 22 and coil 23 of the control relay CR to the negative terminal 12. The operating condition presupposes that switch S is closed to close the contacts 21 and 24.

The energization of coil 23 causes the operation of this control relay closing the contacts 43, 44 and 45, and the opening of contacts 46.

The motor IM brings the machines coupled thereat up to speed and, in consequence, the voltage of the regulating generator builds up. If the upper terminal is considered, the positive terminal then is established from the upper terminal through the series field 36, rheostat 37, the field 38 of the auxiliary generator AG and current limiting resistor 39 to the negative terminal of the regulating generator. The resistor 39 is used to prevent an undue rise in current in the field 36 and thus prevents building up the voltage of the regulating generator before such buildup is desired.

It will be noted that the resistor 40 is in parallel relation to field 29. This means that when the arm 31 is moved clockwise, the excitation of field 29 is increased substantially in proportion to the angular movement, in a clockwise direction, of the arm 31.

The opening of contacts 46 by control relay CR may or may not be of significance at this time. If the voltage of the auxiliary generator AG, in spite of the rather low excitation of field 38 at this time, is sufficiently high to decrease the voltage between junctions 5 and 8 sufficiently to deenergize coil 6 enough to cause the voltage relay VR to drop out, then contacts 10 are open when contacts 46 are opened. In this event, coil 11 of the time limit relay TR is deenergized. If coil 6 is still energized when contacts 46 open, then coil 11 remains energized. From the foregoing, it is apparent that coil 11 becomes deenergized only upon the operation of the control relay CR or the dropout of the voltage relay VR, depending on which event occurs last.

The closing of contacts 45 merely establishes a holding circuit for the coil 23 of the control relay CR. This is apparent from the fact that contacts 45, when closed, shunt contacts 16 and switches 17 and 18.

The closing of contacts 44 shunts resistor 39 to thus increase the excitation of the series field 36 and, in consequence, the excitation of field 38 of the auxiliary generator AG.

The closing of contacts 43 establishes a circuit from the positive junction 5 through resistor 41, pilot field winding 42, contacts 43 and conductor 7 to the negative junction 8. Since the pilot field 42 is now energized, and the excitation of the series field 36 is increased, the voltage of the auxiliary generator is increased rapidly. Since the voltage between junctions 5 and 8, at the instant contacts 43 close, is rather high, the resistor 41 is used to limit the current rise in the pilot field 42.

As the voltage of the auxiliary generator rises, the voltage of junction 5, with respect to junction 8, becomes less and less positive. According to the normal function, the voltage relay VR soon drops out. The drop-out of the voltage relay effects the closing of contacts 47 and 48, and the opening of contacts 10.

The closing of contacts 47 shunts the resistor 41 to thus maintain the rise in the excitation of the pilot field 42 despite the voltage drop between junctions 5 and 8. The closing of contacts 48 merely sets up a partial circuit for the contactor 35.

A selected time interval after the opening of contacts 10, the time limit relay TR drops out, causing the closing of contacts 49. This operation establishes a circuit from the positive terminal 9 through contacts 45, 48 and 49, and the actuating coil 50 of the contactor 35 to the negative terminal 12.

The energization of coil 50 of contactor 35 causes this contactor to operate to close contacts 34 and 52. The closing of contacts 52 completes the paralleling operation and, in so doing, connects junction 5 to junction 8 through resistor 51 and contacts 52. Since contacts 47 and 43 are closed, it is apparent that the pilot field 42 is connected across the resistor 51 and its excitation is thus a measure of the load current of the armature winding of the auxiliary generator AG.

The closing of contacts 34 establishes a circuit from the positively energized conductor 28 through the pattern 29 and conductor 30 and rheostat arm 31 connected in parallel to resistor 40, all the resistor sections of rheostat 32, conductor 33 and contacts 34 to the negative terminal 12.

The rheostat arm 31 is now adjusted—moved clockwise—to increase the excitation of the pattern field 29. The preferred adjustment is such that the excitation of field 29 with reference to the excitation of the pattern field 42 that the auxiliary generator assumes its normal share of load. Any load changes, thereafter, are reflected in the excitation effect of field 42. The regulating generator thus thereafter automatically adjusts the voltage of the auxiliary generator to maintain constant output regardless of the voltage at which the main generator may be operating.

While I have shown and described but one embodiment of my invention, I do not wish to be limited to the particular showing made, but wish to be limited only by the scope of the claims hereto appended.

I claim as my invention:

1. In a control for connecting an auxiliary generator in parallel with a main generator connected in a loop circuit with a motor driving a suitable load, in combination, a field winding for the auxiliary generator, a regulating generator, a series field winding, a current limiting resistor, said regulating generator being connected in a loop circuit including the series field winding—for self-energization of the regulating generator—the field winding of the auxiliary generator, and the current limiting resistor, a pilot field winding, and a pattern field winding for the regulating generator, a control relay which in use is caused to operate to initiate the paralleling of the auxiliary generator with the main generator, switching means operable by the operation of said control relay for short-circuiting the current limiting resistor, to thus increase the excitation of the field winding of the auxiliary generator, and for connecting the pilot field winding to said generators to be connected in parallel to thus excite the pilot field winding as a function of the voltage difference between the main generator and the auxiliary generator, relays means responsive to said voltage difference, and means responsive to said relay means for effecting the energization of the pattern field and the connection of the auxiliary generator in parallel with the main generator.

2. In a control for connecting an auxiliary generator in parallel with a main generator connected in a loop circuit with a motor driving a suitable load, in combination, a field winding for the auxiliary generator, a regulating generator, a series field winding, a current limiting resistor, said regulating generator being connected in a loop circuit including the series field winding—for self-energization of the regulating generator—the field winding of the auxiliary generator, and the current limiting resistor, a pilot field winding, and a pattern field winding for the regulating generator, a control relay which in use is caused to operate to initiate the paralleling of the auxiliary generator with the main generator, switching means operable by the operation of said control relay for short-circuiting the current limiting resistor, to thus increase the excitation of the field winding of the auxiliary generator, and for connecting the pilot field winding to said generators to be connected in parallel to thus excite the pilot field winding as a function of the voltage difference between the main generator and the auxiliary generator, a voltage relay effective to drop out upon a predetermined decrease in voltage difference between the main generator and the auxiliary generator, a contactor, operable a selected time interval after the operation of said voltage relay, for connecting the auxiliary generator in parallel with the main generator.

3. In a control for connecting an auxiliary generator in parallel with a main generator connected in a loop circuit with a motor driving a suitable load, in combination, a field winding for the auxiliary generator, a regulating generator, a series field winding, a current limiting resistor, said regulating generator being connected in a loop circuit including the series field winding—for self-energization of the regulating generator—the field winding of the auxiliary generator, and the current limiting resistor, a pilot field winding, and a pattern field winding for the regulating generator, a control relay which in use is caused to operate to initiate the paralleling of the auxiliary generator with the main generator, switching means operable by the operation of said control relay for short-circuiting the current limiting resistor, to thus increase the excitation of the field winding of the auxiliary generator, and for connecting the pilot field winding to said generators to be connected in parallel to thus excite the pilot field winding as a function of the voltage difference between the main generator and the auxiliary generator, a voltage relay effective to drop out upon a predetermined decrease in voltage difference between the main generator and the auxiliary generator, a time limit relay caused to drop out a selected time interval after the drop-out of the voltage relay, a contactor, operable a selected time interval after the operation of said voltage relay, for connecting the auxiliary generator in parallel with the main generator.

4. In a control for connecting an auxiliary generator in parallel with a main generator connected in a loop circuit with a motor driving a suitable load, in combination, a field winding for the auxiliary generator, a regulating generator, a series field winding, a current limiting resistor, said regulating generator being connected in a loop circuit including the series field winding—for self-energization of the regulating generator—the field winding of the auxiliary generator, and the current limiting resistor, a pilot field winding, and a pattern field winding for the regulating generator, a control relay which in use is caused to operate to initiate the paralleling of the auxiliary generator with the main generator, switching means operable by the operation of said control relay for short-circuiting the current limiting resistor, to thus increase the excitation of the field winding of the auxiliary generator, and for connecting the pilot field winding to said generators to be connected in parallel to thus excite the pilot field winding as a function of the voltage difference between the main generator and the auxiliary generator, a voltage relay effective to drop out upon a predetermined decrease in voltage difference between the main generator and the auxiliary generator, a contactor operable a selected time interval after the operation of said voltage relay, for connecting the auxiliary generator in parallel with the main generator, and means responsive to the operation of the container for effecting the energization of the pattern field winding.

5. In a control for connecting an auxiliary generator in parallel with a main generator connected in a loop circuit with a motor driving a suitable load, in combination, a field winding for the auxiliary generator, a regulating generator, a series field winding, a current limiting resistor, said regulating generator being connected in a loop circuit including the series field winding—for self-energization of the regulating generator—the field winding of the auxiliary generator, and the current limiting resistor, a pilot field winding, and a pattern field winding for the regulating generator, a control relay which in use is caused to operate to initiate the paralleling of the auxiliary generator with the main generator, a switching means operable by the operation of said control relay for short-circuiting the current limiting resistor, to thus increase the excitation of the field winding of the auxiliary generator, and for connecting the pilot field winding to said generators to be connected in parallel to thus excite the pilot field winding as a function of the voltage difference between the main generator and the auxiliary generator, a voltage relay effective to drop out upon a predetermined decrease in voltage difference between the main generator and the auxiliary generator, a time limit relay caused to drop out a selected time interval after the drop-out of the voltage relay, a contactor, operable a selected time interval after the operation of said voltage relay, for connecting the auxiliary generator in parallel with the main generator, and means responsive to the operation of the contactor for effecting the energization of the pattern field winding.

6. In a control system for controlling the parallel operation of a pair of direct current generators, in combination, a main generator connected to a suitable load and adjusted to supply a given voltage to said load, an auxiliary generator, a resistor, switching means, said auxiliary generator having its positive terminal connected to the positive terminal of the main generator and its negative terminal, when said switching means are closed, to the negative terminal of the main generator through said resistor, a field winding for the auxiliary generator, a regulating generator having a series field winding, connected to energize the field winding of the auxiliary generator, a pattern field for the regulating generator excited at a given value, and a pilot field for the regulating generator, said pilot field being connected across said resistor to thus receive an exciting current that is a function of the load current of the auxiliary generator.

7. In a control for a pair of direct current generators connected in parallel to supply a common load, in combination, a resistor having one end connected to the negative terminal of one generator and the other end connected to the negative terminal of the other generator, means for selecting the voltage to be generated by one of said generators, a regulating generator for supplying excitation to the other generator of a value to cause said other generator to assume its appropriate share of the load, a pattern field for the regulating generator, a field for the regulating generator for causing a voltage that is a function of the excitation of the other generator, and a field for the regulating generator that is connected to said resistor ends to thus be energized as a function of the load current of the second, or other, generator and as a function of the voltage difference at corresponding terminals between the generators.

8. In a system of control, in combination, a main generator having a suitable load connected across the positive and negative terminals of the generator, said generator providing a constant preselected voltage between its terminals, an auxiliary generator having its positive terminal connected to the positive terminal of the main generator, a resistor having one end connected to the negative terminal of the auxiliary generator, switching means for connecting the other end of the resistor to the negative terminal of the main generator, a voltage relay connected to the negative terminals of said generators to thus be responsive to the voltage difference between said generators, a regulating generator having a series field connected to excite said auxiliary generator, a pilot field for the regulator generator, means for simultaneously increasing the excitation effect of said series field and for connecting the pilot field across the negative terminals of said main and auxiliary generators, means responsive to the drop-out of said voltage relay for in succession decreasing the resistance of the pilot field circuit and for effecting the operation of said switching means.

9. In a system of control, in combination, a main generator having a suitable load connected across the positive and negative terminals of the generator, said generator providing a constant preselected voltage between its terminals, an auxiliary generator having its positive terminal connected to the positive terminal of the main generator, a resistor having one end connected to the negative terminal of the auxiliary generator, switching means for connecting the other end of the resistor to the negative terminal of the main generator, a voltage relay connected to the negative terminals of said generators to thus be responsive to the voltage difference between said generators, a regulating generator having a series field connected to excite said auxiliary generator, a pilot field for the regulator generator, means for simultaneously increasing the excitation effect of said series field and for connecting the pilot field across the negative terminals of said main and auxiliary generators, means responsive to the drop-out of said voltage relay for in succession decreasing the resistance of the pilot field circuit and for effecting the operation of said switching means, and a pattern field for the regulating generator, means operable by said switching means for causing the energization of the pattern field.

WALTER R. HARRIS.